US011449369B2

(12) United States Patent
Yao

(10) Patent No.: US 11,449,369 B2
(45) Date of Patent: Sep. 20, 2022

(54) BROADCAST EVENT PROCESSING METHOD AND DEVICE

(71) Applicant: HUAWEI TECHNOLOGIES CO., LTD., Shenzhen (CN)

(72) Inventor: Xin Yao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/637,611

(22) PCT Filed: Aug. 8, 2017

(86) PCT No.: PCT/CN2017/096453
§ 371 (c)(1),
(2) Date: Feb. 7, 2020

(87) PCT Pub. No.: WO2019/028680
PCT Pub. Date: Feb. 14, 2019

(65) Prior Publication Data
US 2020/0167211 A1 May 28, 2020

(51) Int. Cl.
*G06F 3/00* (2006.01)
*G06F 9/54* (2006.01)
*G06F 9/445* (2018.01)

(52) U.S. Cl.
CPC .......... *G06F 9/542* (2013.01); *G06F 9/44505* (2013.01); *G06F 9/546* (2013.01)

(58) Field of Classification Search
CPC ...................................................... G06F 9/542
USPC ...................................................... 719/318
See application file for complete search history.

(56) References Cited

U.S. PATENT DOCUMENTS

| 8,887,152 | B1 | 11/2014 | Chen et al. |
| 9,372,681 | B1 * | 6/2016 | Shevchenko ............. G06F 8/61 |
| 9,710,368 | B1 * | 7/2017 | Gundeti ............. G06F 11/3688 |
| 2008/0244640 | A1 * | 10/2008 | Belleguie ......... H04N 21/44016 725/35 |

(Continued)

FOREIGN PATENT DOCUMENTS

| CN | 104267977 A | 1/2015 |
| CN | 105094278 A | 11/2015 |

(Continued)

OTHER PUBLICATIONS

K. R. Jayaram, Parametric Content-Based Publish/Subscribe. (Year: 2013).*
Erika Chin, Analyzing Inter-Application Communication in Android. (Year: 2011).*
Daniel J. Barrett, A Framework for Event-Based Software Integration. (Year: 1996).*

(Continued)

*Primary Examiner* — Lechi Truong
(74) *Attorney, Agent, or Firm* — Stein IP, LLC

(57) ABSTRACT

The present disclosure relates to a broadcast event processing method and an apparatus. In the broadcast event processing method, whether current user equipment satisfies a broadcast limiting condition is determined after a broadcast event is received, and after it is determined that the current user equipment satisfies the broadcast limiting condition, a first application is launched. The first application has subscribed to the broadcast event. According to a solution provided in this application, application launching triggered by the broadcast event can be flexibly controlled, thereby reducing power consumption of the user equipment and improving user experience.

22 Claims, 13 Drawing Sheets

(56) References Cited

U.S. PATENT DOCUMENTS

| | | | | |
|---|---|---|---|---|
| 2009/0298418 A1* | 12/2009 | Michael | ............ | H04N 5/44543 |
| | | | | 455/3.04 |
| 2013/0102300 A1* | 4/2013 | Sigal | ............ | H04W 4/48 |
| | | | | 455/418 |
| 2014/0068632 A1 | 3/2014 | Tan et al. | | |
| 2014/0195584 A1 | 7/2014 | Harrison | | |
| 2014/0215557 A1* | 7/2014 | Vishnubhatt | ............ | H04L 63/10 |
| | | | | 726/3 |
| 2016/0119483 A1* | 4/2016 | Chisty | ............ | H04M 1/2535 |
| | | | | 370/259 |
| 2016/0227042 A1* | 8/2016 | Gray | ............ | H04M 3/42042 |
| 2017/0116005 A1* | 4/2017 | Oya | ............ | G06F 9/44505 |
| 2018/0262552 A1* | 9/2018 | Park | ............ | H01F 27/04 |

FOREIGN PATENT DOCUMENTS

| | | | | | |
|---|---|---|---|---|---|
| CN | 105677533 | A | | 6/2016 | |
| CN | 105740008 | A | | 7/2016 | |
| CN | 105893839 | A | | 8/2016 | |
| CN | 106502748 | A | | 3/2017 | |
| CN | 106528386 | A | | 3/2017 | |
| CN | 106569832 | A | | 4/2017 | |
| CN | 106874048 | A | | 6/2017 | |
| CN | 106951333 | A | * | 7/2017 | ............ G06F 1/329 |

OTHER PUBLICATIONS

Harika Gannu, Trackme Android Application. (Year: 2014).*
XP055705256 BMC Software Confidential"BMC Knowledge Management 9.0",dated Apr. 30, 2015,total 251 pages.

* cited by examiner

BROADCAST EVENT PROCESSING METHOD AND DEVICE

CROSS-REFERENCE TO RELATED APPLICATIONS

This application is a National Stage of International Patent Application No. PCT/CN2017/096453 filed on Aug. 8, 2017, which is hereby incorporated by reference in its entirety.

TECHNICAL FIELD

Embodiments of the present disclosure relate to the field of intelligent terminals, and more specifically, to a broadcast event processing method and a device.

BACKGROUND

The latest developments in digital technologies enable a user to use user equipment conveniently to communicate and process personal information. Examples of the user equipment include a mobile communications terminal, a personal digital assistant (PDA), a smartphone, and a tablet computer. Particularly, the user equipment has developed into a mobile convergent device supporting functions such as a voice call, a video call, an SMS message, an email, navigation, imaging capturing, media (video and music) play, Internet access, an instant message, and a social networking service (SNS).

A mobile terminal may use an operating system (OS) such as an Android operating system of Google or iOS of Apple. A mobile device usually includes a plurality of application programs. Each application program has a specific function or service to perform, which can be used by the user or another application program, so as to complete a series of activities.

An Android application program may send or receive a broadcast message to/from the operating system and another application program. For example, when a system starts or a device begins to charge, the Android system sends a broadcast. The application program may further send a user-defined broadcast, for example, notify another application program of content in which the another application program may be interested (for example, some new data has been downloaded).

The application program may be registered for receiving a specific broadcast. When a broadcast event to which the application program subscribes occurs, if the application program is not launched, the operating system launches the application program that subscribes to the broadcast event (for example, an activity or a service of the application program, or a process associated with the application program), and provides information related to the event to the application program (for example, an intent object). If a plurality of application programs are registered for receiving a broadcast event, when the broadcast event occurs, and these application programs are not launched, the operating system launches one by one the application programs subscribing to the broadcast event. After being launched, each application program usually further needs to upgrade automatically or update resource information, which consumes a great quantity of system resources, causes the user equipment to lag during operation, and affects user experience.

SUMMARY

This specification describes a broadcast event processing method and a device, to improve smoothness of user equipment and reduce power consumption of the user equipment.

According to a first aspect, an embodiment of the present disclosure provides a broadcast event processing method. The method includes: receiving a broadcast event (for example, a broadcast event (such as a network status change) sent by an Android system or another application program); determining whether a broadcast limiting condition is satisfied; and launching a first application when it is determined that the broadcast limiting condition is satisfied, where the first application is a subscriber to the broadcast event (that is, the first application has subscribed to the broadcast event).

When a plurality of applications subscribe to a broadcast event and the broadcast event occurs, if these applications are not launched, an operating system launches these applications (for example, an activity, a service, or a related process of these applications). After being launched, an application program usually further needs to upgrade automatically or update resource information, which consumes a great quantity of system resources, and causes user equipment to lag frequently during operation. This embodiment of the present disclosure provides the broadcast event processing method in which the broadcast limiting condition is used to limit a launch driven by the broadcast event, which can reduce system resource consumption.

For example, when the broadcast event to which the first application subscribes occurs, whether the broadcast limiting condition is satisfied (for example, whether a broadcast frequency limitation is satisfied (for example, the broadcast is allowed to wake up or launch the application merely once a day)) is first determined; and when it is determined that the broadcast limiting condition is satisfied (for example, the first application is not launched because of the broadcast event in a day), the operating system launches the first application (for example, an activity, a service, or a related process of the first application). In this way, an application launch triggered by the broadcast event can be effectively controlled by using the broadcast limiting condition, so as to improve system smoothness.

In a possible design, the first application subscribes to the broadcast event in a static registration or dynamic registration manner.

When the first application subscribes to the broadcast event in the static registration manner, the broadcast limiting condition is saved in an application control file of the first application. Optionally, the application control file is a manifest (Manifest) file (AndroidManifest.xml). In this way, after the first application is installed or upgraded, the system may parse the application control file and save the control file.

In a possible design, after the launching a first application, the method further includes: sending the broadcast event to the first application. After the first application is launched, the broadcast event is further transferred to the first application, so that the first application can learn of a message transferred by the broadcast event.

In a possible design, the broadcast event is generated by an operating system or a second application. The second application and the first application are both installed in the operating system, and the two applications are different. Optionally, the operating system is an Android operating system.

In a possible design, the broadcast limiting condition includes at least one of a broadcast frequency limitation, a network status limitation of user equipment, an application status limitation, or a broadcast content limitation.

For example, the system maintains a counter counter (an initial value is set to zero). When the broadcast event occurs, the system determines whether the counter counter satisfies the broadcast frequency limitation (for example, the system determines whether the counter is less than or equal to N). If the counter is less than or equal to N, the system launches the first application, and increases a value of the counter by 1.

In a possible design, before the determining whether a broadcast limiting condition is satisfied, the method further includes: determining that the first application is not launched. If the first application has been launched when the broadcast event occurs, the broadcast limiting condition is not used to limit the broadcast event. If the first application is not launched when the broadcast event occurs, whether the broadcast limiting condition is satisfied is determined. When it is determined that the broadcast limiting condition is satisfied, the first application is launched, where the first application is a subscriber to the broadcast event.

According to a second aspect, an embodiment of the present disclosure provides user equipment. The user equipment has a function of implementing the foregoing method in the first aspect. The function may be implemented by using hardware, or may be implemented by hardware by executing corresponding software. The hardware or the software includes one or more modules corresponding to the foregoing function.

In a possible design, the user equipment includes a memory, one or more processors, a plurality of application programs, and one or more programs. The one or more programs are stored in the memory. When the one or more processors execute the one or more programs, the user equipment is enabled to perform the following steps: receiving a broadcast event; determining whether a broadcast limiting condition is satisfied; and launching a first application when determining that the broadcast limiting condition is satisfied, where the first application is a subscriber to the broadcast event.

According to a third aspect, an embodiment of the present disclosure provides a computer program product including an instruction. When the computer program product is run on user equipment, the user equipment is enabled to perform the broadcast event processing method according to the first aspect and any possible design of the first aspect.

According to a fourth aspect, an embodiment of the present disclosure provides a computer readable storage medium. The computer readable storage medium includes a computer instruction. When the computer instruction is run on a device, the device is enabled to perform the broadcast event processing method according to the first aspect and any possible design of the first aspect.

Compared with the prior art, solutions provided in the present disclosure can improve smoothness of the user equipment.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may derive other drawings from these accompanying drawings without creative efforts.

DESCRIPTION OF EMBODIMENTS

The following describes the technical solutions in the embodiments of the present disclosure with reference to the accompanying drawings in the embodiments of the present disclosure.

Aspects of the present disclosure relate to a broadcast event processing method and an apparatus. After a broadcast event is received, whether current user equipment satisfies a broadcast limiting condition may be determined, and correspondingly launching of an application program is controlled to improve smoothness of the user equipment. A person skilled in the art should understand that principles in the present disclosure may be implemented in any wireless mobile communications apparatus that is properly arranged.

In descriptions, a broadcast event or a broadcast refers to a broadcast message sent by an application program or a system of the user equipment. The message sometimes is referred to as an event or an intent. The application program may monitor a broadcast from the system or another application program, and may perform a launch operation or enable a related process after the broadcast occurs.

In the descriptions, the application program may be any one of a foreground application program, a background application program, or a process or a thread, in the system, related to the application program.

In the descriptions, the broadcast limiting condition refers to a condition that needs to be satisfied when the broadcast event is transferred to the application program.

The following describes a structure of the user equipment and an operation performed by the user equipment with reference to the accompanying drawings. However, configuration and the operation of the user equipment are not limited to the following descriptions, and various changes and modifications may be made based on the following descriptions.

Figure 1:
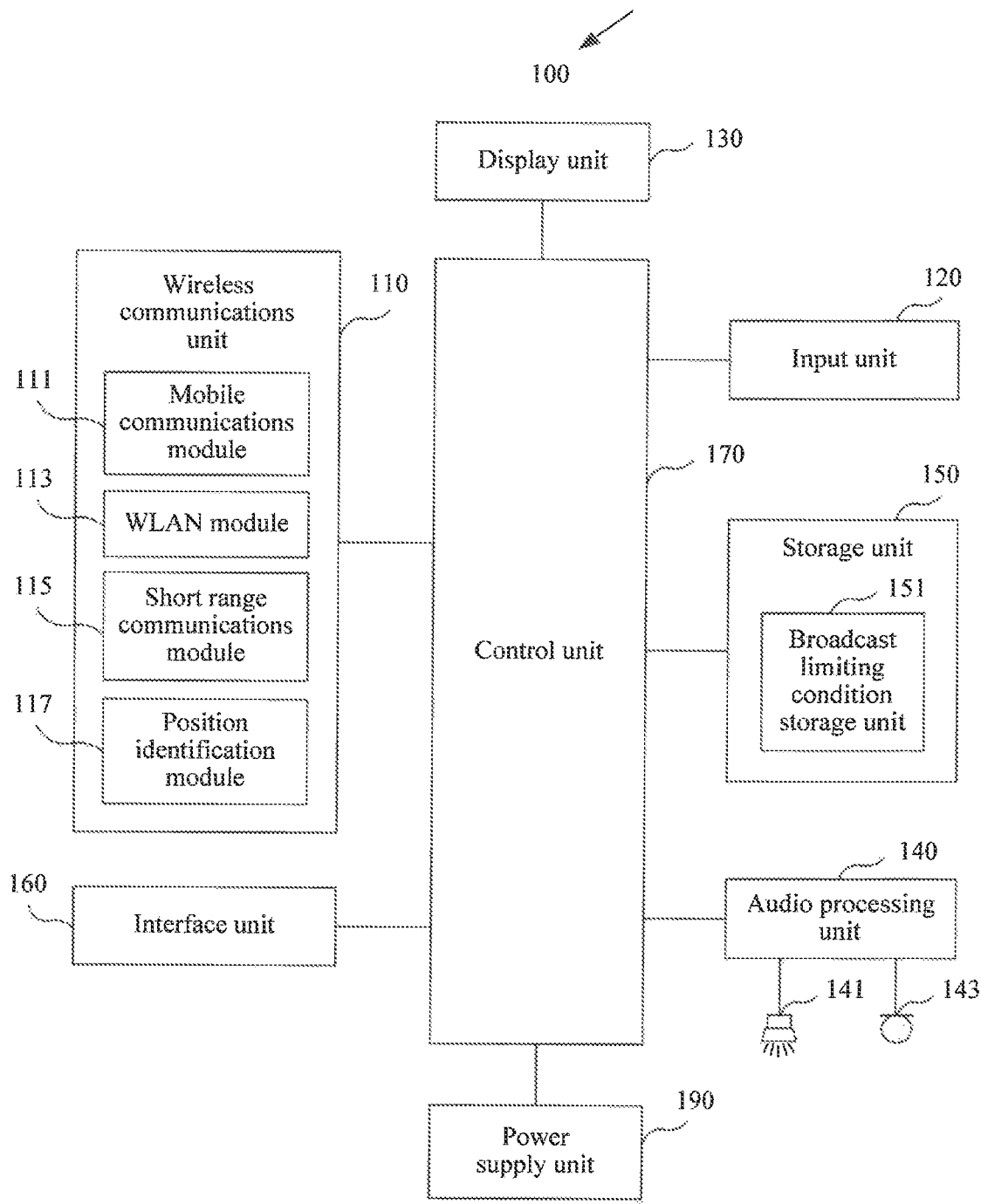
FIG. 1 is a schematic structural diagram of user equipment according to an embodiment of the present disclosure.

FIG. 1 shows a block diagram of user equipment according to an embodiment of the present disclosure.

Referring to FIG. 1, user equipment 100 includes: a wireless communications unit 110, an input unit 120, a display unit 130, an audio processing unit 140, a storage unit 150, an interface unit 160, a control unit 170, and a power supply unit 190. It may be understood that components of the user equipment shown in FIG. 1 are not indispensable. A new component may be added, or an existing component may be omitted or replaced. For example, when the user equipment does not support communication, the wireless communications unit 110 may be omitted.

The wireless communications unit 110 may include one or more communications modules, so as to support wireless communication between the user equipment and a wireless communications system, or between the user equipment and a network connected to another user equipment. For example, the wireless communications unit 110 may include a mobile communications module 111, a wireless local area network (WLAN) module 113, a short range communications module 115, and a position identification module 117.

The mobile communications module 111 sends a radio signal to at least one of a base station, an external terminal, or a server by using a mobile communications network, and receives a radio signal from at least one of the base station, the external terminal, or the server by using the mobile communications network. The radio signal may include various types of data related to a voice call, a video call, and a text or multimedia message. The mobile communications module 111 may be connected to a content server, for example, a Google Play App market, and download a selected application. Particularly, the mobile communications module 111 may be connected to, for example, an operator server or a provider server of the content server, and under control of the control unit 170, download an application program installation package, an application program upgrade package, or a related broadcast limiting condition, so as to control a broadcast event.

The WLAN module 113 is configured to access the Internet wirelessly, or form a WLAN link to another user equipment. The WLAN module 113 may be an internal module or a mobile module. The WLAN module 113 may be connected to a content server, for example, Google Play, and download a selected application. Particularly, the WLAN module 113 may be connected to the provider server, and under control of the control unit 170, download an application program installation package, an application program upgrade package, or a related broadcast limiting condition, so as to control a broadcast event.

The short range communications module 115 communicates within a short range based on various technologies such as Bluetooth, RFID (radio frequency identification), IrDA (Infrared Data Association), UWB (Ultra-wideband), ZigBee, and NFC (Near Field Communication). When a short range communication link to external user equipment is established, the short range communications module 115 may send, to the external user equipment or receive from the external user equipment based on a selection of a user, an application program installation package, an application program upgrade package, or a related broadcast limiting condition, so as to control a broadcast event.

The position identification module 117 is configured to identify a current position of the user equipment. A GPS (global positioning system) receiver is a typical example. The position identification module 117 may obtain 3D position information including a longitude, a latitude, and an altitude by using distance and time data received from three or more base stations. The position identification module 117 may obtain current position information by using distance and time data received from three or more GPS satellites.

The input unit 120 generates an input signal used to manipulate the user equipment. The input unit 120 may include a keyboard, a switch, a (resistive/capacitive) touchpad, and a scroll wheel. The input unit 120 may be implemented by using an external button of the user equipment and a button displayed on a touch panel.

The display unit 130 is configured to display a graph, an image, or data to the user. The display unit 130 is configured to provide various screens associated with operations of the user equipment 100. The display unit 130 provides a home screen, a message writing screen, a phone call screen, a game screen, a music playing screen, and a video playing screen. Particularly, the display unit 130 may display various UI or GUI screens for application installation. For example, in response to a user request, the display unit 130 may display a screen for downloading an application, a screen for upgrading an application, or the like. During application execution, the display unit 130 may display an application screen.

The display unit 130 may be implemented by using a flat display panel (such as a liquid crystal display (LCD), an organic light-emitting diode (OLED), and an active-matrix OLED (AMOLED)).

The display unit 130 may combine with a touch panel sensing a touch gesture to form a touchscreen used as an input and output apparatus. The touch panel may generate a corresponding electrical input signal of a change in capacitance or pressure caused by touching a part of the display unit 130. The touch panel may detect a position, an area, and pressure of a touch. A signal corresponding to the touch on the touch panel is sent to a touch controller (not shown). The touch controller processes the touch signal and sends corresponding touch data to the control unit 170. Therefore, the control unit 170 may identify a touch area of the display unit 130.

The audio processing unit 140 sends an audio signal from the control unit 170 to a speaker 141, and sends an audio signal such as a voice signal from a microphone 143 to the control unit 170. Under control of the control unit 170, the audio processing unit 140 may output voice or sound data by using the speaker 141, convert an audio signal of a voice signal collected by, for example, the microphone 143, into a digital signal, and send the digital signal to the control unit 170.

The speaker 141 is configured to: during a call, output audio data received by the wireless communications unit 110, or stored in the storage unit 150. The speaker 141 is configured to output a sound related to a function that is being performed, such as application program execution, application program installation, call reception, image capturing, or music playing.

The microphone 143 collects a sound signal from the outside during a call, recording, voice identifying, or image capturing, and converts the sound signal into sound data. During a call, the sound data may be sent to a base station by using the mobile communications module 111. In the microphone 143, various noise reduction algorithms may be used to remove or reduce noise in the sound signal collected from the outside.

The storage unit 150 may store a program used for an operation of the control unit 170, and temporarily store input/output data such as an application, a broadcast limiting condition, an image file, a phone number, a message, an audio file, a video file, and an e-book. Particularly, the storage unit 150 includes a broadcast limiting condition storage unit 151 configured to store a broadcast limiting condition of an application. The broadcast limiting condition storage unit 151 is configured to store a broadcast limiting condition of an application program obtained from, for example, a network operator, a user equipment manufacturer, or an application program installation package.

The storage unit 150 may include one or more of various types of storage media, such as a flash memory, a hard disk, a memory card, a random access memory (RAM), a static random access memory, a read-only memory (ROM), a programmable read-only memory (PROM), an electrically erasable programmable read-only memory (EEPROM), a magnetoresistive RAM (MRAM), a magnetic disk, and an optical disc. The user equipment may further work collaboratively with a network memory that is used as a storage unit on the Internet.

The interface unit 160 is configured to provide data or a power supply path to an external device connected to the user equipment. The interface unit 160 is configured to send data to the external device and receive data from the external device, and may receive electric power from an external power supply. For example, the interface unit 160 may include one or more ports applied to a wired/wireless headset, a battery charger, a wired/wireless data memory, a memory card, audio input/output, and video input/output.

The control unit 170 controls an overall operation of the user equipment. For example, the control unit 170 may perform a control and processing operation used for a voice call, a video call, and a data call. The control unit 170 may include a multimedia module for multimedia playing (not shown). Particularly, the control unit 170 controls broadcast event management based on the broadcast limiting condition, and an overall operation performed in the disclosed embodiments. The control unit 170 may refer to the broadcast limiting condition stored in the storage unit 150, to control launching of an application program driven by a broadcast event.

Under control of the control unit 170, the power supply unit 190 supplies power from an internal or external power supply to the components of the user equipment.

The user equipment 100 shown in FIG. 1 may be a communications device or a multimedia device using an application processor (AP), a graphics processing unit (GPU), or a central processing unit (CPU). For example, the user equipment may be a tablet computer, a smartphone, a digital camera, a portable multimedia player (PMP), a media player, a portable game console, or a personal digital assistant (PDA). In addition, the method in the disclosed embodiment may be applied to various display devices such as a digital television, a digital signage (DS), and a large format display (LFD).

The user equipment 100 shown in FIG. 1 may have a provider-specific operating system. A conventional mobile operating system (OS) used by a smartphone includes, for example, Android, iOS, Symbian, BlackBerry OS, Bada, Windows Phone, web OS, and embedded Linux distributions, such as Maemo and MeeGo.

Android is an operating system based on Linux, and devices powered by Android include an all-round smartphone, a tablet computer, and a netbook. Android is free and open sourced, and has become the favorite of mobile application developers. Application program developers of independent "third parties" develop emerging third party application programs for the Android operating system. The Android operating system disclosed in this specification is used as an example or a model operating system of a mobile computing device. However, it should be understood that principles disclosed in this specification are not limited to the Android operating system. Instead, the principles are also applicable to another operating system that may have a same or similar feature as Android.

Android application programs are mostly compiled in a Java programming language. The application programs include Java classes, methods, and code required for implementing functions described in this specification, and usually include an activity, a service, a content provider, and a broadcast receiver. As known in this field, these application components are four types of components in Android applications.

A function of the broadcast receiver is to monitor an intent of a broadcast from the system or a user program. The broadcast receiver is essentially a global monitor of the Android system. An Android platform operates by using an asynchronous message mechanism referred to as "intent". The intent may include an abstract description of an action to be performed, and information that may be based on the intent is applied to perform some operations. The broadcast receiver may be configured by using a control file of an application program (for example, AndroidManifest.xml).

In an embodiment, monitoring an event is implemented by stating an "intent filter" for one of components of the application program (or the broadcast receiver). This component tells the operating system that the application program is interested in receiving a specific type of broadcast event. When an event matching the stated intent filter of the application program occurs, the operating system starts a component of the application program that registers for the intent filter (for example, an activity or a service of the application program, or a process associated with the application program), and provides information about the event to the application program (for example, an intent object).

When the system or a user application program sends a broadcast, if an application program that satisfies a condition is not launched, the application program is launched first, and then receives the broadcast. For example, some application programs are registered for receiving a startup broadcast (android.intent.action.BOOT_COMPLETED). In this way, after the user equipment sends the startup broadcast, all application programs that need to receive the startup broadcast are launched. For another example, some applications are registered for a broadcast of a network status change (android.net.conn.CONNECTIVITY_CHANGE). In this way, after a network status of the user equipment changes (for example, from no network to a 4G network), an application program that needs to receive the broadcast of the network status change is also launched. After being launched, the application program usually further needs to upgrade automatically or update resource information, which consumes a great quantity of system resources, causes the user equipment to lag frequently during operation, and greatly affects user experience. Therefore, a broadcast event control mechanism is beneficial to be introduced, to control launching of an application program driven by the broadcast event, so as to improve system smoothness.

Generally, the system or the application program sends the broadcast by using sendBroadcast(Intent), or sendOrderedBroadcast(Intent, String, BroadCastReceiver, Handler, int, String, Bundle). These two sending manners respectively correspond to two different broadcasts. The sendBroadcast(Intent) is used to send a common broadcast, and the sendOrderedBroadcast(Intent, String, BroadCast- Receiver, Handler, int, String, Bundle) is used to send an ordered broadcast, where a function parameter intent is a broadcast intent.

To enable the broadcast receiver to receive a broadcast event, the broadcast receiver needs to be registered first. In general, the broadcast receiver may use two registration types: static registration and dynamic registration.

The static registration is implemented by defining, in a control file of an application (for example, AndroidManifest.xml), the broadcast receiver and setting a reception intent (Intent). When the system starts up, a package manager service (PMS) is responsible for scanning some directories of the system one by one, parsing a control file of an application in an application program installation package file (for example, AndroidManifest.xml), searching for a broadcast receiver registered herein, and loading the broadcast receiver to a memory. A feature of the static registration manner is that a corresponding broadcast can be monitored and received regardless of whether an application program is launched or not.

For example, when an application program is registered in the static registration manner, so as to monitor a broadcast of a network status change (CONNECTIVITY_CHANGE), the following code sample indicates that when the network status of the user equipment changes, the system sends a broadcast, and the broadcast is to be received by a broadcast receiver expanded by itself. The code sample is as follows:

```
<receiver android:name=".MyBroadCastReceiver">
    <action android:name="android.net.conn.CON-
    NECTIVITY_CHANGE"/>
    <state
android:name=android.net.conn.CONNECTIVITY_CHANGE@Im-
plicitBroadcastExpandandroid:value="LimitNum#Day=5|WiFi-
Status=WIFICON"/>
</receiver>
```

MyBroadCastReceiver is a class name (class name) of the broadcast receiver, and monitoring a broadcast event of the network status change (CONNECTIVITY_CHANGE) is implemented by stating an intent filter (intent filter).

The dynamic registration means using a registerReceiver( ) method for registration. The dynamic registration is more flexible, and the registration may be cancelled by using unregisterReceiver( ) when registration is unnecessary. An activity manager service (AMS) is responsible for a dynamic broadcast.

A dynamic registration method includes the following steps:

1) Instantiate a user-defined broadcast receiver,
2) instantiate an intent filter, and set a broadcast type to be filtered (for example, we receive a broadcast sent by an SMS message system); and
3) use a registerReceiver (BroadcastReceiver, IntentFilter, String, Handler) method of Context for broadcast registration.

Taking registering for a broadcast of monitoring a received SMS message (SMS_RECEIVED) as an example, sample code registered in the dynamic registration manner is as follows:

```
//Instantiate a defined BroadcastReceiver
MyBroadCastReceiver yBroadCastReceiver = new
MyBroadCastReceiver( );
```

-continued

```
//Instantiate the filter and set a broadcast to be filtered
    IntentFilter intentFilter = new
IntentFilter("android.provider.Telephony.SMS_RECEIVED");
    //Register for the broadcast
    myContext.registerReceiver(smsBroadCastReceiver,intentFilter,
"android.permission.RECEIVE_SMS", null);
```

To limit component launching of the application program (for example, an activity or a service of the application program, or a process associated with the application program) driven by the broadcast, the present disclosure expands the broadcast event processing mechanism. When a broadcast event that an application registers for (or subscribes to) occurs, whether a broadcast limiting condition is satisfied is determined. When the broadcast limiting condition is satisfied, the application is launched, and the broadcast event is transferred to the application; and when the broadcast limiting condition is not satisfied, the broadcast event may be discarded, or the application is launched until the broadcast limiting condition is satisfied.

With reference to the figure used for operating and control of the user equipment, the following describes an operation of the control unit 170 in detail.

Figure 2:
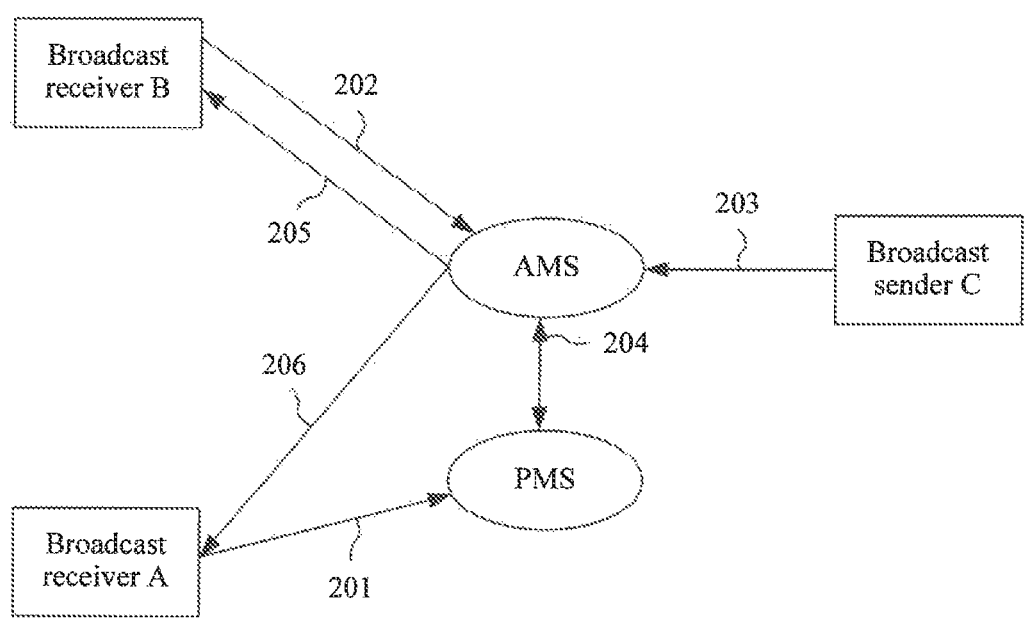
FIG. 2 is a schematic diagram of a broadcast processing mechanism according to an embodiment of the present disclosure.

FIG. 2 shows a broadcast processing mechanism according to an embodiment of the present disclosure. Referring to FIG. 2, a broadcast receiver A is registered by using a static registration manner, so as to monitor and receive a corresponding broadcast (for example, a broadcast of a network status change CONNECTIVITY_CHANGE), and at the same time states a prerequisite for receiving the broadcast (namely, a broadcast limiting condition). For example, the broadcast receiver states a prerequisite for receiving the CONNECTIVITY_CHANGE broadcast in a control file of an application program:

```
<intent-filter>
    <action android:name="android.net.conn.CON-
    NECTIVITY_CHANGE"/>
    <state
android:name=android.net.conn.CONNECTIVITY_CHANGE@Im-
plicitBroadcastExpand
        android:value="LimitNum#Day=5|WiFiStatus=WIFICON"/>
</intent-filter>
```

It may be learned from the foregoing example that different from the foregoing common static registration manner, the following condition statement is added:

```
<state
android:name=android.net.conn.CONNECTIVITY_CHANGE@Im-
plicitBroadcastExpand
        android:value="LimitNum#Day=5|WiFiStatus=WIFICONNECTED"/>
```

A keyword state indicates that a receiving condition of a broadcast event is stated herein, and @ImplicitBroadcastExpand indicates an implicit expansion of the CONNECTIVITY_CHANGE broadcast herein in the system.

LimitNum #Day=5 indicates that a maximum number of times of allowing the broadcast to launch the application in a day is five times. WiFiStatus=WiFiConnected indicates that the broadcast can be received only when a Wi-Fi network is connected. Using a symbol "|" to connect two conditions adjacent to the symbol indicates that the application program can be launched only when both the two conditions are satisfied. To be specific, the broadcast event can be allowed to launch the application program only when the Wi-Fi network is connected, and the broadcast is allowed to launch the application program at most five times a day.

As described above, in an embodiment, the control file of the application program (for example, AndroidManifest.xml) may be used to register the broadcast receiver A and state a prerequisite (that is, the broadcast limiting condition) for the broadcast receiver A (or a corresponding application program of the broadcast receiver A) to receive the broadcast. After the broadcast receiver A is registered and states the prerequisite for receiving the broadcast, in step 201, a package manager service (PMS) may parse the control file of the application program (for example, AndroidManifest.xml) to search for the registered broadcast receiver A and obtain the prerequisite that is for receiving the broadcast and that is stated by the broadcast receiver A (or the corresponding application program of the broadcast receiver A). When the system starts up, the package manager service (PackageManagerService, PMS) may be responsible for scanning some directories of the system one by one, and parsing the control file of the application in an application program installation package file, so as to obtain a prerequisite that is for receiving a broadcast event and that is stated by the application program.

In another embodiment, the broadcast limiting condition may be saved in another file different from the application control file, for example, saved at a position, in the storage unit 150, used to maintain a prerequisite that is for receiving a broadcast event and that is specified by an application program provider, a terminal vendor, a mobile operator, or a user.

Referring to FIG. 2, a broadcast receiver B is registered in a dynamic registration manner, so as to monitor a corresponding broadcast (for example, a broadcast of a network status change CONNECTIVITY_CHANGE). As described above, the registerReceiver( ) method may be used to perform dynamic registration. The dynamically registered broadcast receiver B is stored in an mReceiverResolver variable of an activity manager service (AMS) in a form of BroadcastFilter. In step 202, the activity manager service (AMS) obtains the dynamically registered receiver B. Similarly, the broadcast receiver B (or a corresponding application program of the broadcast receiver B) may also state a prerequisite for receiving the broadcast (that is, the broadcast limiting condition). For example, the registerReceiver (BroadcastReceiver receiver, IntentFilter filter) manner is used to register the broadcast receiver B, where a first parameter receiver is a broadcast receiver that is to process a broadcast (for example, the broadcast receiver B), and a second parameter is an intent filter. The prerequisite for receiving the broadcast (that is, the broadcast limiting condition) may be stated in the second parameter filter.

In step 203, a broadcast sender C sends the broadcast to the AMS. As described above, the system or the user application program may send the broadcast by using the sendBroadcast(Intent). A system broadcast is a corresponding broadcast sent in a basic operation related to the user equipment (for example, a low battery power, a network status change, or a locked screen).

In step 204, the AMS obtains, by using the PMS, the statically registered broadcast receiver A that matches the broadcast received in step 203.

If the broadcast receiver B does not state the broadcast limiting condition, in step 205, the AMS obtains the dynamically registered broadcast receiver B that matches the broadcast received in step 203, and sends the broadcast to the broadcast receiver B. If the broadcast receiver B has stated the broadcast limiting condition, in step 205, after obtaining the dynamically registered broadcast receiver B that matches the broadcast received in step 203, the AMS further needs to determine whether the broadcast limiting condition is satisfied currently. If the broadcast limiting condition is satisfied, the AMS sends the broadcast to the broadcast receiver B.

In step 206, the AMS determines whether a broadcast limiting condition corresponding to the broadcast receiver A is satisfied currently. If the broadcast limiting condition is satisfied, the AMS obtains the statically registered broadcast receiver A that matches the broadcast received in step 203, launches an application program corresponding to the broadcast receiver A, and transfers a broadcast event to the application.

With reference to Table 1, the following describes the broadcast limiting condition in detail. The broadcast limiting condition stated by the application program may include one or a combination of a plurality of conditions shown in Table 1. When a broadcast event occurs, if it is determined that a broadcast limiting condition stated by an application program is satisfied, the application program is launched.

In an implementation, application launching frequency (particularly, refers to application launching driven by the broadcast event herein) is limited in the broadcast limiting condition. For example, the application launching frequency is limited to five times a day (LimitNum #Day=5) or five times an hour (LimitNum #Hour=5). Alternatively, a minimum time interval between application launching may be limited to 10 minutes (MinInterval=10 (min)), or a maximum time interval between application launching is limited to 15 minutes (MaxInterval=15 (min)).

In another implementation, a current network status of the user equipment is limited in the broadcast limiting condition. Only when any one of an LTE network connection status, a Wi-Fi network connection status, a network registration status, a Bluetooth connection status, or a SIM card status of the user equipment satisfies a condition, the user equipment is allowed to launch an application program, and after launching the application program, transfers a broadcast event to the application program.

For example, for a payment application with a relatively high security level, because a security level of a mobile network (for example, an LTE network) is usually higher than a security level of a Wi-Fi network, it may be limited as follows. The application is allowed to receive a broadcast event only when an LTE network status is a connected state (LTEStatus=LTEConnected). A terminal may query whether a current LTE mobile network is in the connected state. If the user equipment is connected to the LTE network, the user equipment is allowed to launch an application program, and after launching the application program, transfers a broadcast event to the application program.

Figure 3:
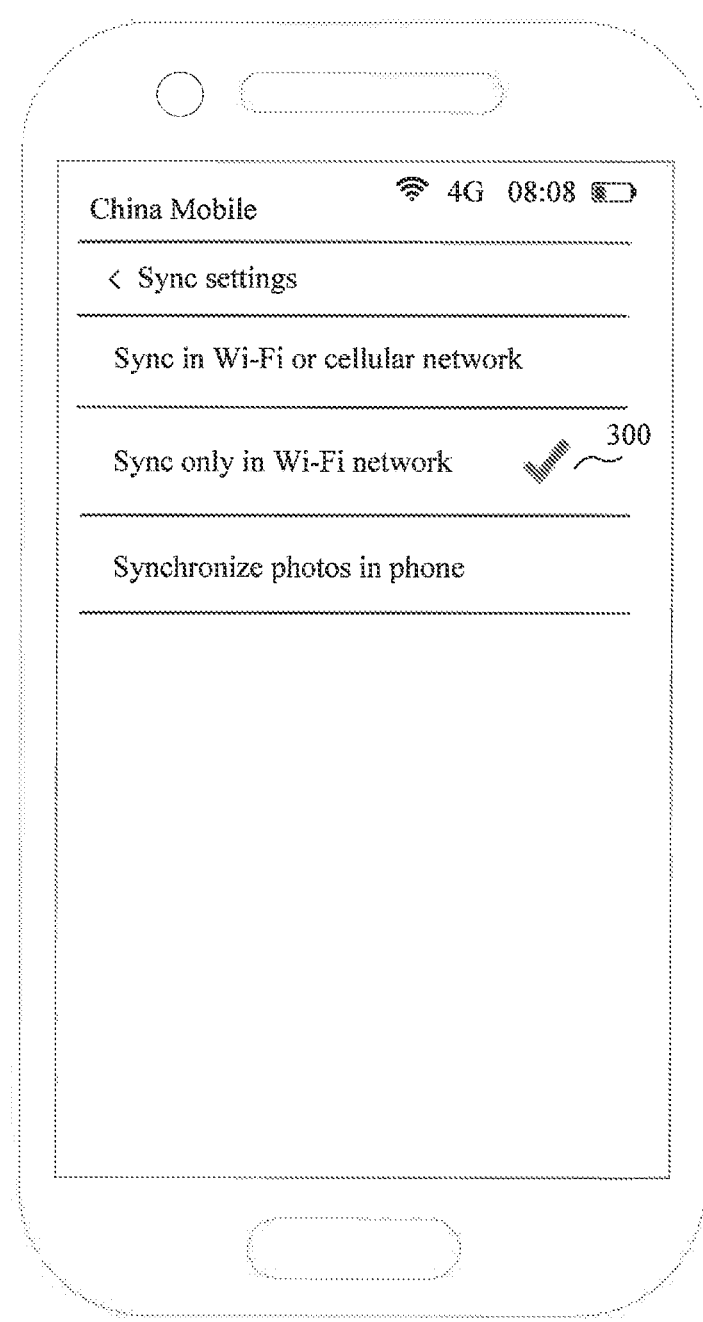
FIG. 3 is a schematic diagram of applying cloud synchronization setting.

For example, referring to FIG. 3, for a mobile application connected to a cloud to perform data content synchronization (for example, a network cloud disk Dropbox, a cloud album, or a cloud note), the user may set an option 300 "Sync only in Wi-Fi network" for these cloud synchronization applications. When the user equipment is connected to the Wi-Fi network, one or more mobile applications may be synchronized. By using Wi-Fi to synchronize the mobile applications, the user may save a data traffic package. It may be limited as follows. Only when the Wi-Fi network connection status is the connected state (WiFiStatus=WiFiConnected), the application is allowed to receive a broadcast event. The terminal may query whether a current Wi-Fi network is in the connected state. If the user equipment is connected to the Wi-Fi network, the user equipment is allowed to launch an application program, and after launching the application program, transfers a broadcast event to the application program.

For example, for application SkyTone (an application providing an abroad data network service to tourists going abroad; similar applications such as MI roaming, SAMSUNG Data Store, Lenovo Connect), and for this type of application, providing the abroad data network service, that is used only when the user is abroad, a condition may be defined. To be specific, whether the application receives the broadcast event is determined based on a network roaming status of the user equipment. If the user equipment is in an abroad roaming network (NetRegisterStatus=Roaming), the application providing the abroad data network service is allowed to receive the broadcast event. In this way, frequent launching of this type of application providing the abroad data network service may be avoided when the user is within a domestic network, so as to improve system smoothness and reduce power consumption of the user equipment.

Figure 4:
FIG. 4 is a schematic diagram of a health application.

For example, usually a health application is used cooperatively with a wearable device, for example, a heart rate measurement application 400 shown in FIG. 4. The health application is installed on the user equipment. A biosensor (for example, a photoplethysmogram (PPG) signal sensor, an electrocardiogram (ECG) sensor, an electromyography (EMG) sensor, or a bioelectrical impedance sensor) is integrated in the wearable device (for example, a smart band, a smartwatch, or a smart sports headphone). The health application of the user equipment obtains physical health information of the user (for example, temperature, blood pressure, heart rhythm, or blood oxygen saturation) by using the biosensor of the wearable device, analyses collected biometric data (biometric data), informs the user of a health condition, and provides real-time health suggestions to the user. The user equipment and the wearable device usually communicate by using Bluetooth or in another short range communications manner. Usually, this type of health application is used cooperatively with the wearable device. It may be limited as follows. Only when a Bluetooth connection status is a connected state (BluetoothStatus=BluetoothConnected), the application is allowed to receive a broadcast event. The terminal may query whether a current Bluetooth status is the connected state. If the user equipment is connected to the wearable device by using Bluetooth, the user equipment is allowed to launch an application program, and after launching the application program, transfers a broadcast event to the application program.

In still another implementation, a status of the application is limited in the broadcast limiting condition. For example, it may be limited as follows. Only when the status of the application is not running (AppStatus=NotRunning), the application is allowed to receive a broadcast event. The terminal may detect a current running status of the application. If currently the application is not running, the application is allowed to be launched and receive the broadcast event.

Figure 5:
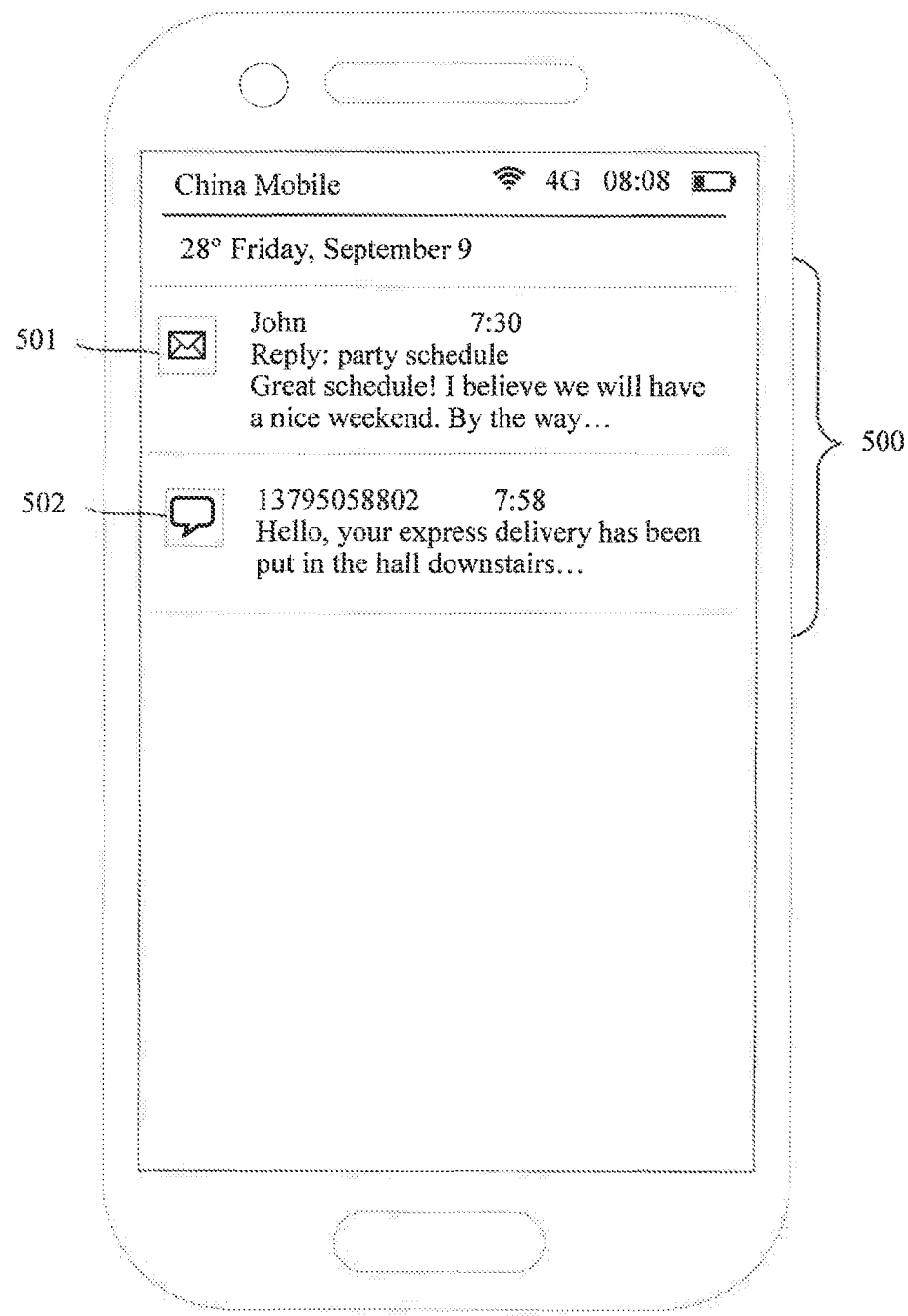
FIG. 5 is a schematic diagram of a pull-down state of a status bar.

In another implementation, a status of a status bar is limited in the broadcast limiting condition. Referring to FIG. 5, the user pulls down the status bar, and the user equipment may display a notification 500 of a received event (for example, an SMS message notification, an email notification, or an instant messaging notification). A notification shown in the figure includes an email notification 501 and an SMS message notification 502. An APP store or a news application usually provides a notification to the user. For example, the APP store notifies the user that the user can download an application, and a notification technology described herein may be used to notify the user of availability of a new application version. If the user chooses the notification when the notification is displayed, the user equipment may download the new application version. For this type of application providing a notification to the user, a condition may be defined. To be specific, whether to receive a broadcast event is determined based on the status of the status bar of the user equipment. For example, only when the status bar of the user equipment is in a pull-down state (StatusBar=PullDown), the application is allowed to receive the broadcast event. In this way, the broadcast event is allowed to launch the application only when the user expects to view the notification.

Figure 6:
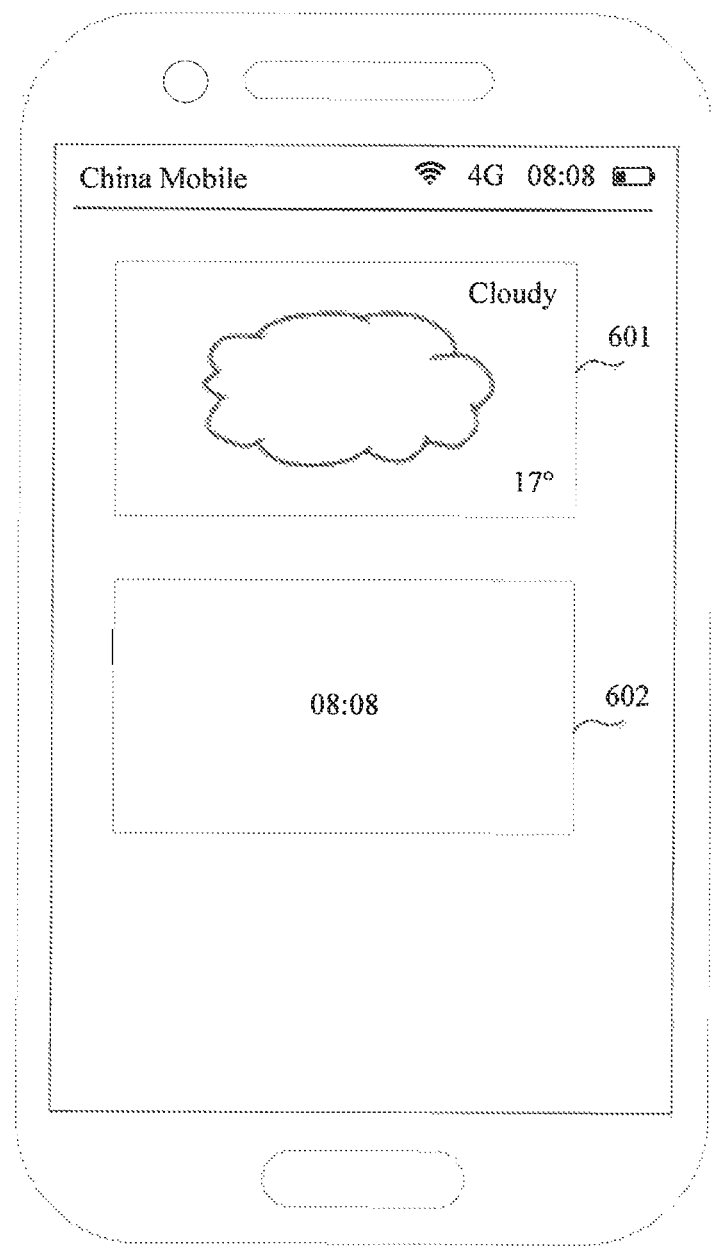
FIG. 6 is a schematic diagram of a widget of user equipment.

In still another implementation, a status of a widget (Widget) is limited in the broadcast limiting condition. The widget (Widget) is a user interface element, and includes one or more tools for the user to perform a common task and providing the user with quick access to information. The widget may perform various tasks, which include but are not limited to communicating with a remote server to provide information (for example, a weather report) to the user, provide a usually required function (for example, a calculator), or work as an information repository (for example, a notebook). FIG. 6 shows a weather widget 601 and a clock widget 602. The user may drag the widget to a desktop, and further display information pushed by an application program on the desktop of the mobile terminal by using the widget, so that information of the application program is quickly and conveniently displayed. A condition may be defined. To be specific, whether to receive a broadcast event is determined based on whether the widget (Widget) is placed on the desktop. For example, only when the widget (Widget) is placed on the desktop (WidgetStatus=OnScreen), the application is allowed to be launched and receive a broadcast.

In an implementation, content of a broadcast is limited in the broadcast limiting condition. For example, a corresponding broadcast is sent both during application installation and uninstallation. When application installation is completed, the system sends an android.intent.action.PACKAGE_ADDED broadcast. A package name of the application installed may be obtained by using intent.getDataString( ). When a program is uninstalled, the system sends an android.intent.action.PACKAGE_REMOVED broadcast. A package name of the application uninstalled may also be obtained by using intent.getDataString( ). A condition may be defined. To be specific, whether to receive a broadcast event is determined based on content of a broadcast. For example, only when a package name of an application installation broadcast is WeChat (com.tencent.mm), an application program is allowed to be launched, and after the application program is launched, a broadcast event is transferred to the application program.

The broadcast limiting condition may be a combination of various types of conditions in Table 1, that is, any combination that needs to be implemented. For example, the broadcast limiting condition may be defined as "A|B|C| . . . |N". A, B, C, or N represents one condition. Using a symbol "|" to connect adjacent conditions indicates that the broadcast can be received only when these conditions are all satisfied. In the foregoing example, the broadcast can be received only when conditions A, B, C, . . . , and N are satisfied. As an example, the broadcast limiting condition is defined as: WiFiStatus=WiFiConnected|AppStatus=NotRunning|StatusBar=PullDown. That is, the broadcast limiting condition is defined as follows. Wi-Fi is in a connected state, the application in not running, and the status bar is in a pull-down state.

As an example, the control unit 170 may parse the application control file, and determine whether the broadcast limiting condition is described in the application control file. After determining that a broadcast event occurs, the control unit 170 determines whether the broadcast limiting condition is satisfied. If determining that the broadcast limiting condition is satisfied, the control unit 170 launches the application.

TABLE 1

| Condition category | Condition subcategory | Example |
|---|---|---|
| Limited launching frequency | Times limited in a day | LimitNum#Day = 5 |
| | Times limited in an hour | LimitNum#Hour = 5 |
| | Minimum time interval limit (hour, minute) | MinInterval = 10 (min) |
| | Maximum time interval limit (hour, minute) | MaxInterval = 15 (min) |
| Network status | LTE network connection status (connected, disconnected) | LTEStatus = LTEConnected or LTEStatus = LTEDisconnected |
| | Wi-Fi network connection status (connected, disconnected) | WiFiStatus = WiFiConnected or WiFiStatus = WiFiDisconnected |
| | Network registration status (registered, unregistered, roaming) | NetRegisterStatus = Registered or NetRegisterStatus = UnRegistered or NetRegisterStatus = Roaming |
| | Bluetooth connection status (connected, disconnected) | BluetoothStatus = BluetoothConnected or BluetoothStatus = BluetoothDisconnected |
| | SIM card status (absent, locked, ready) | SIMStatus = Absent or SIMStatus = Locked or SIMStatus = Ready |
| Application status | Application running status (running, not running) | AppStatus = Running or AppStatus = NotRunning |
| | Status bar pull-down display (pull-down state, hidden state) | StatusBar = PullDown or StatusBar = Hidden |
| | Widget desktop status (on screen, not on screen) | WidgetStatus = OnScreen or WidgetStatus = NotOnScreen |
| Broadcast content filtering | Receive a broadcast when content of the broadcast contains specific content | BroadcastContainContent(string) |

The following describes a method for stating the broadcast limiting condition. In an embodiment, the broadcast limiting condition may be specified by the terminal vendor, the mobile operator, or the user. For example, the terminal vendor or the mobile operator puts an upgrade package of a system software version to an OTA server by using an over-the-air technology (Over-the-Air Technology, OTA). The user equipment uses, based on a current system software version, an air interface to search for a corresponding upgrade package of a system software version, downloads the upgrade package of the system software version to a mobile phone terminal, and upgrades a version of the mobile phone terminal to a new system software version. The system upgrade package includes broadcast limiting conditions specified by the terminal vendor. These limiting conditions may be separately customized for application programs in the system (that is, a first application and a second application in a terminal may be corresponding to different broadcast limiting conditions), or may be uniformly customized (that is, the first application and the second application in the terminal may be corresponding to same broadcast limiting conditions). In addition, the user may also generate the broadcast limiting conditions through editing on the user interface. These specified broadcast limiting conditions may be stored in the storage unit 150.

In some other embodiments, the broadcast limiting condition is included in a control file of an application program (for example, AndroidManifest.xml). After the application program is installed or upgraded, a package manager service (PackageManagerService, PMS) may obtain the control file of the application, and further obtain the broadcast limiting condition of the application. Installation of the application program means that the user equipment obtains an installation package of the application program from the content server (for example, an APP market), and installs the application program in the user equipment. An upgrade of the application program, in a general sense, refers to an update of the application program from a lower version to a higher version. Because the higher version usually can fix some bugs of the lower version, an updated application program usually obtains better optimization compared to an original version, and has better performance.

FIG. 7 to FIG. 10 describe screen representations of application installation in the user equipment.

Figure 7:
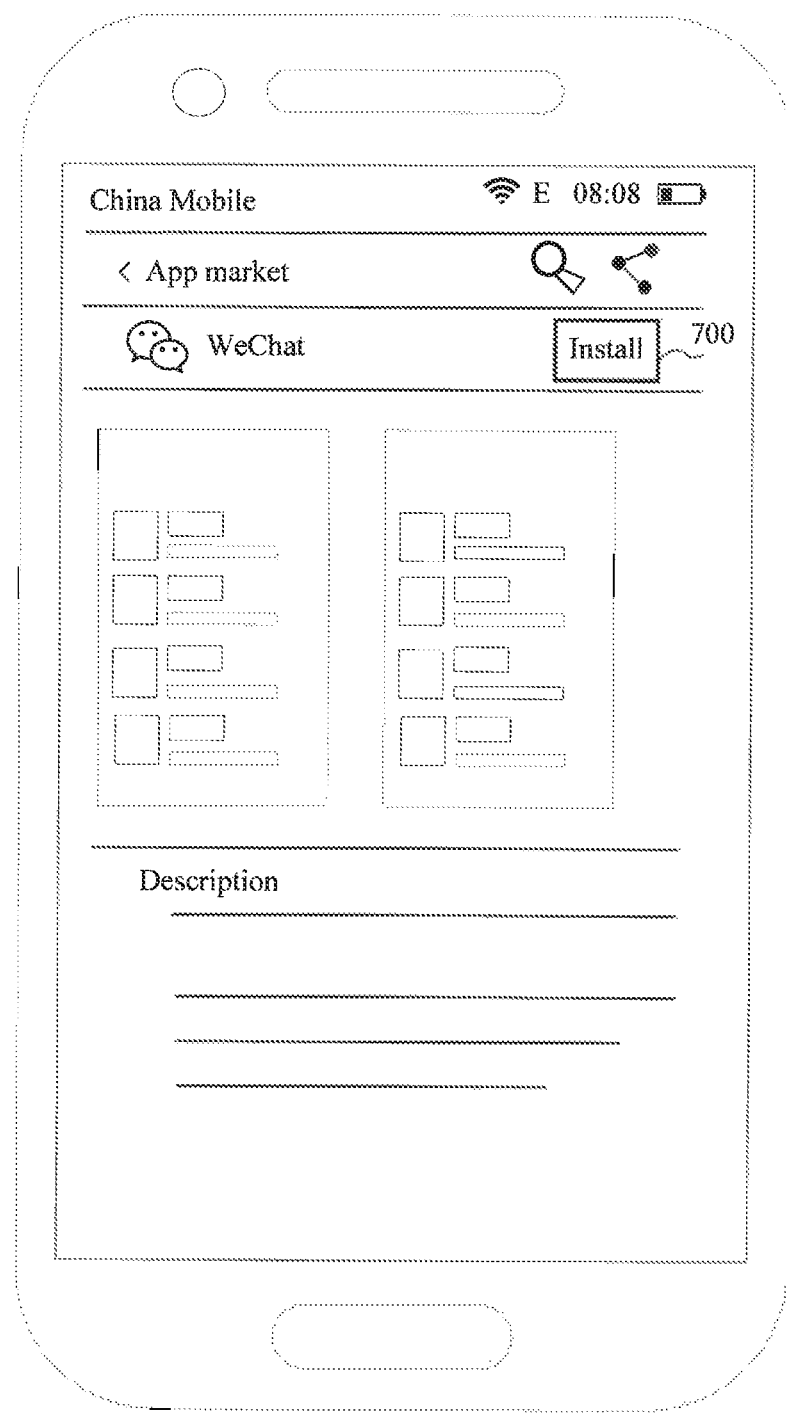
FIG. 7 is a schematic diagram of application installation according to an embodiment of the present disclosure.

FIG. 7 shows an application installation screen waiting for a user to choose to start downloading. For example, in response to a user command used to access a content server (for example, an APP market), the user equipment may be connected to the content server by using the wireless communications unit 110 (especially, the mobile communications module 111 or the WLAN module 113). In response to an input user command, the user equipment may select an application from the content server, download the selected application, and display an application installation screen.

In FIG. 7, to start installation of an application program (for example, WeChat), the user may generate a selection event on an installation icon 700. For example, the user may select or touch the installation icon 700 on the installation screen. After receiving the selection event from the installation icon 700, the user equipment may obtain an application installation package, and install the application.

Figure 8:
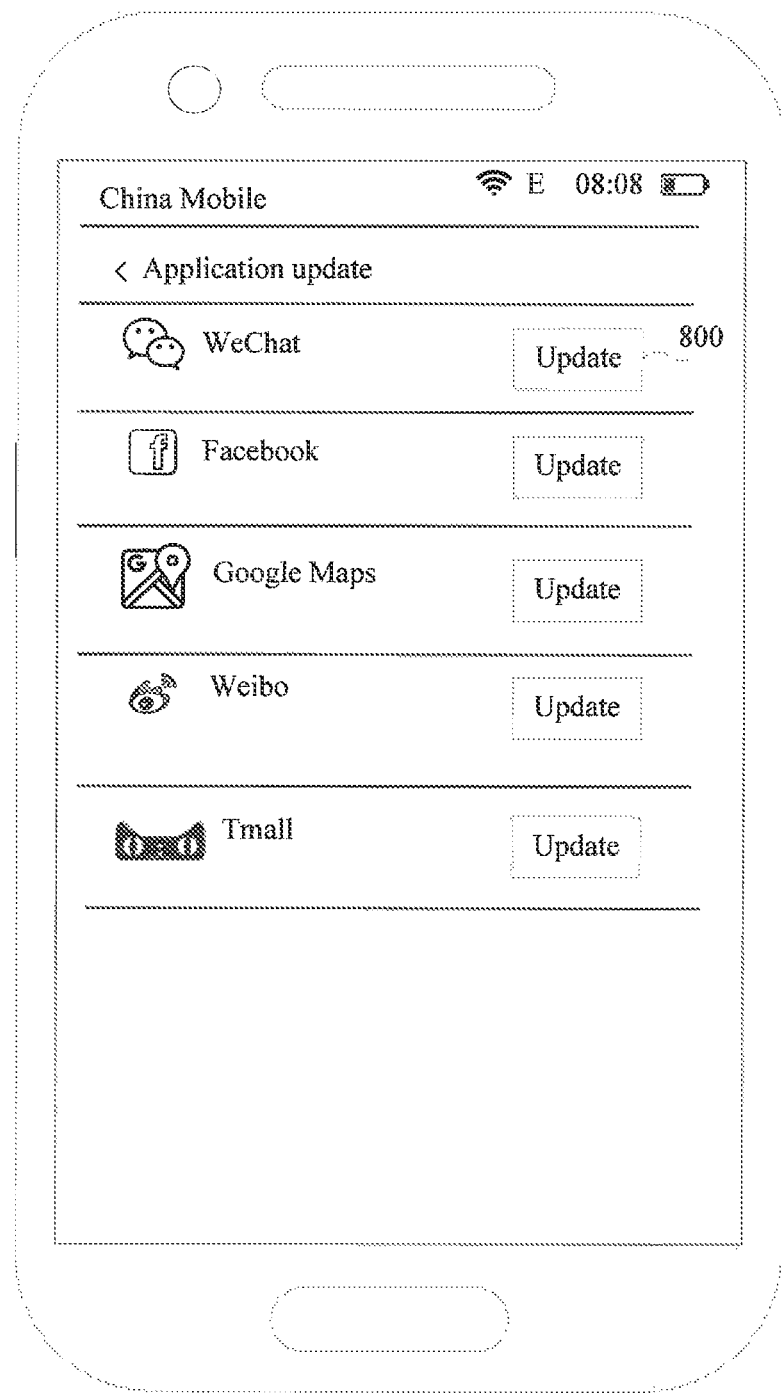
FIG. 8 is a schematic diagram of application upgrade according to an embodiment of the present disclosure.

In FIG. 8, to update or upgrade an installed application program (for example, WeChat), the user may generate a selection event on an update icon 800. For example, the user may select or touch the update icon 800 on the installation screen. After receiving the selection event from the update icon 800, the user equipment may obtain an application upgrade package, and upgrade the application (for example, upgrade the application from a version 1.0 to a version 2.0).

If a control file included in an installation package of the application program includes a broadcast limiting condition, the control unit 170 installs the application program. After the user selects the installation icon 700 in FIG. 7 or the upgrade icon 800 in FIG. 8, the user equipment directly downloads and installs the application without confirmation from the user. For example, the control unit 170 may control an operation of installing an application downloaded from the content server in the user equipment After the application program is installed or upgraded, a package manager service (PackageManagerService, PMS) may obtain the control file of the application, and further obtain the broadcast limiting condition of the application.

Figure 9:
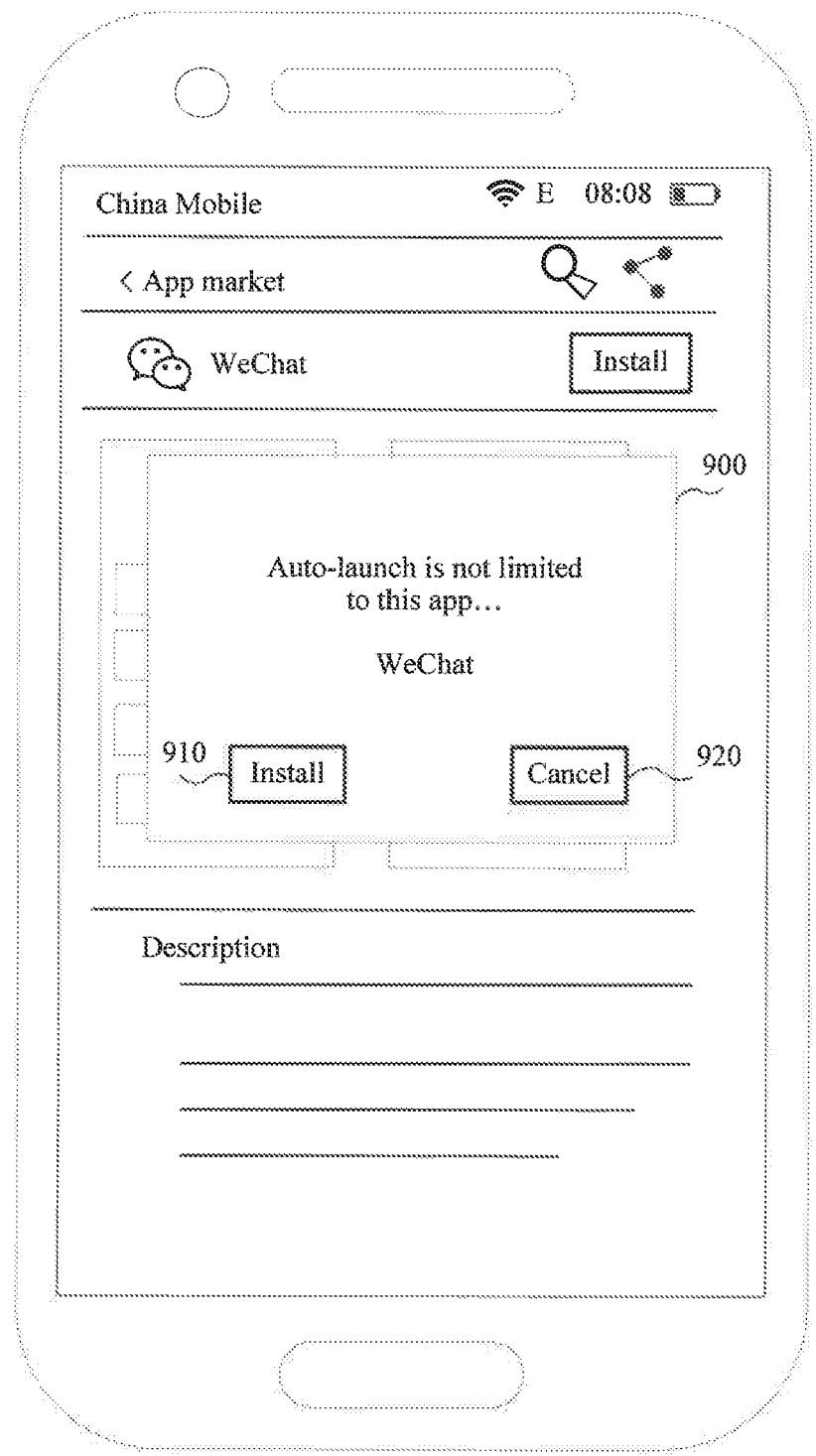
FIG. 9 is a schematic diagram of an application installation prompt in user equipment according to an embodiment of the present disclosure.

In an embodiment, when the broadcast limiting condition is not stated in the control file of the application program (for example, AndroidManifest.xml), the control unit 170 requests the user to confirm installation of the application program, and checks whether the user confirms installation of the application program. For example, the control unit 170 may control the user equipment to output a pop-up window 900, to request the user to determine whether to start or cancel installation of the application program that does not state the broadcast limiting condition. FIG. 9 shows the pop-up window 900. The pop-up window 900 includes prompt content "Auto-launch is not limited to this app" (especially, the "auto-launch" herein refers to launching of an application program driven by a broadcast), which prompts the user that the application does not state the broadcast limiting condition, the application may be frequently launched because of a broadcast event, and a waste of system resources may be caused. A proper prompt enables the user to choose to start or cancel installation of an application on which auto-launch management is not performed (especially, launching of an application program driven by a broadcast). Herein, based on settings of the user, the step of requesting the user to determine whether to launch the application program that does not state the broadcast limiting condition (or that does not limit auto-launch) may be skipped, and the pop-up window 900 may or may not be output.

The user may determine, by using the pop-up window 900, whether to start installation of the application program on which auto-launch management is not performed (that is, does not state the broadcast limiting condition). For example, the user may select or touch an installation button 910 on the pop-up window 900 to start installation of the application on which auto-launch management is not performed. The user may select or touch a cancel button 920 on the pop-up window 900 to cancel installation of the application on which auto-launch management is not performed.

Figure 10:
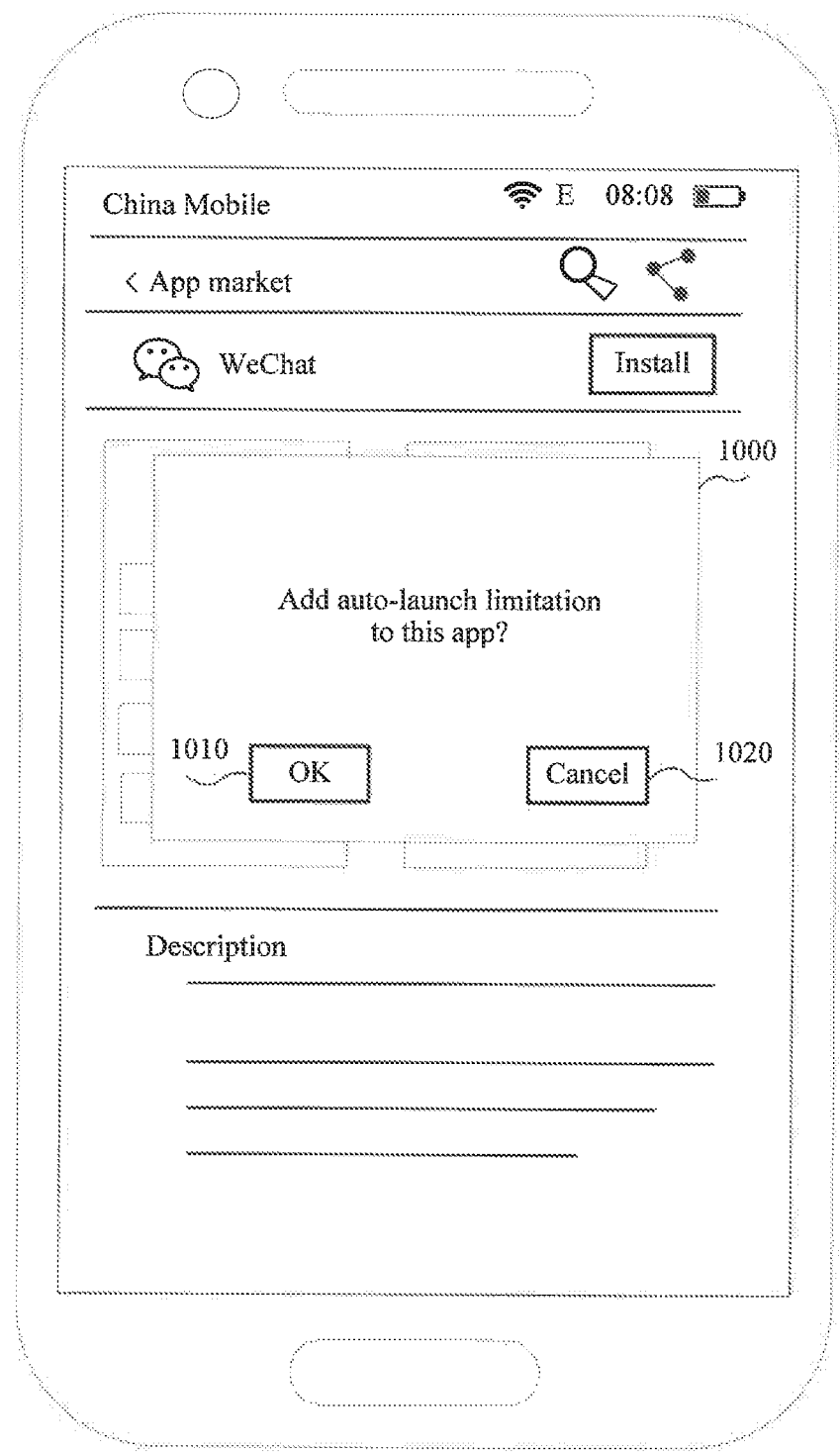
FIG. 10 is a schematic diagram of an application installation prompt in user equipment according to another embodiment of the present disclosure.

When receiving user input used to determine starting or cancellation of installation of the application, the user equipment may output a screen shown in FIG. 10 or FIG. 7.

That is, when the user chooses, by using the pop-up window 900, to install the application on which auto-launch management is not performed, the user equipment may display a pop-up window 1000. The pop-up window 1000 requests the user to determine whether to add an auto-launch limitation to the application. That is, in response to a choice of continuing to install the application by the user, a screen of the user equipment transfers from the displayed screen FIG. 9 to FIG. 10. When the user chooses, by using the pop-up window 900, to cancel installation of the application on which auto-launch management is not performed, the user equipment may return to the application installation screen shown in FIG. 7.

As shown in FIG. 10, the user may choose whether to place the auto-launch limitation on the application. For example, the user may select or touch an "OK" button 1010 on the pop-up window 1000, to add the auto-launch limitation to the application. The user may select or touch a "Cancel" button 1020 on the pop-up window 1000, so as not to add the auto-launch limitation to the application.

When the "OK" button 1010 is selected, the user equipment adds the auto-launch limitation to the application, and starts installation of the application. When the "Cancel" button 1020 is selected, the user equipment may directly start installation of the application program.

As described above, in the disclosed embodiments, installation of the application on which auto-launch management is not performed may need consent of the user, and the broadcast limiting condition may be added to these applications to perform application auto-launch management.

Figure 11:
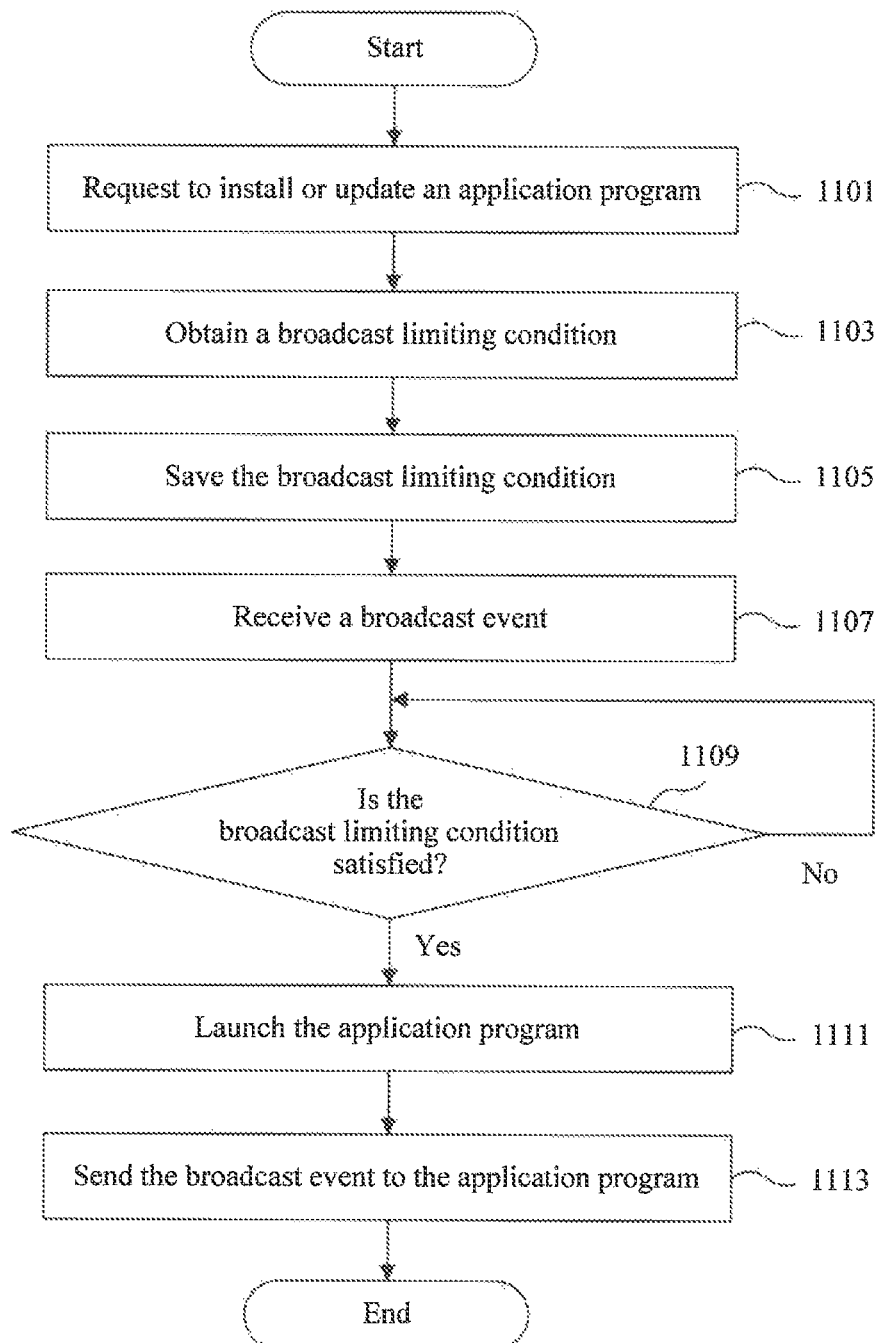
FIG. 11 is a flowchart of broadcast event processing according to an embodiment of the present disclosure.
Figure 12:
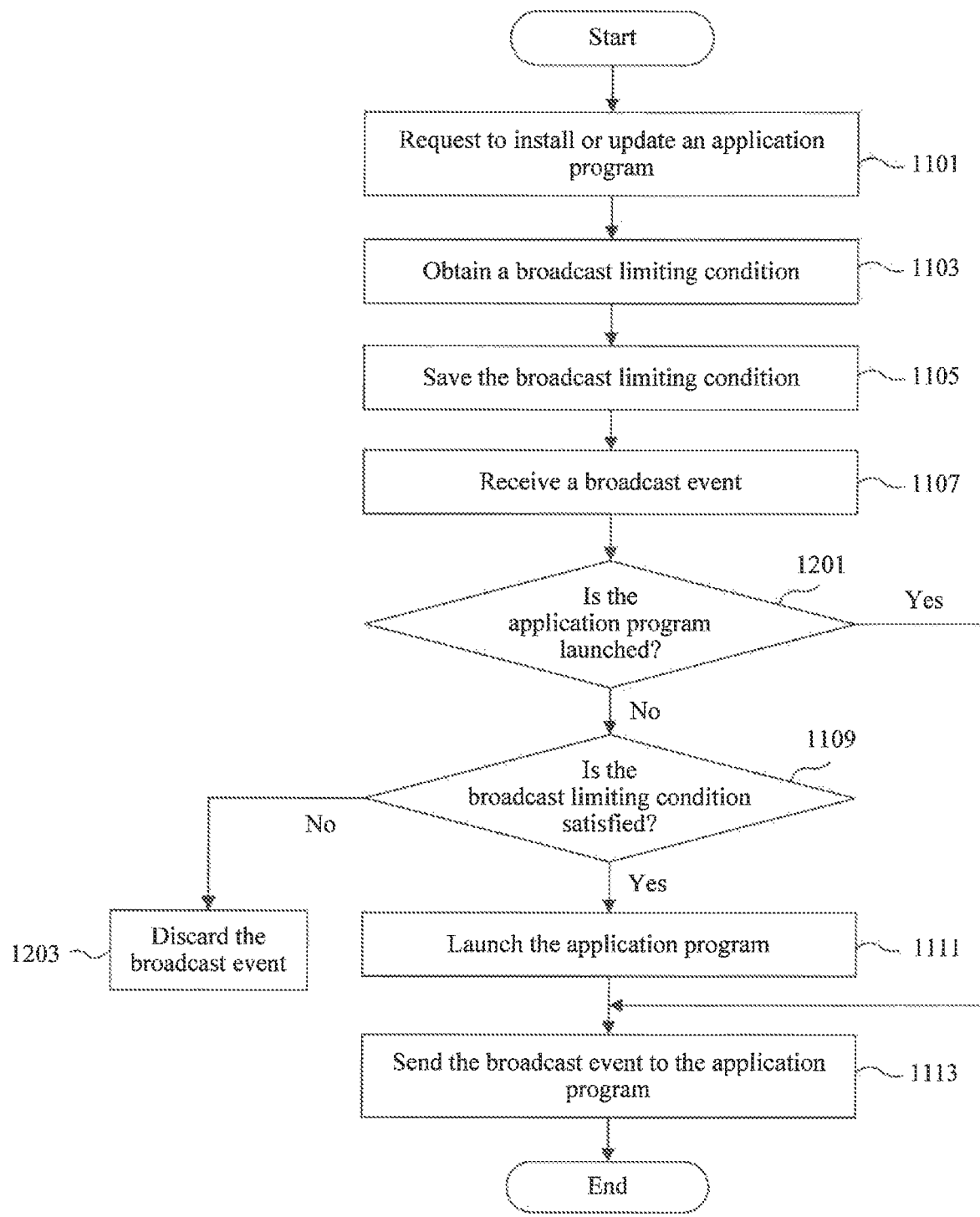
FIG. 12 is a flowchart of broadcast event processing according to another embodiment of the present disclosure.

With reference to FIG. 11 and FIG. 12, the following describes an operation performed by the control unit 170 for implementing a broadcast limiting mechanism of the present disclosure.

The control unit 170 (or a processor of user equipment) receives a broadcast event (for example, a broadcast event generated by an operating system or a second application), determines whether the user equipment currently satisfies a broadcast limiting condition, and launches a first application when determining that the user equipment currently satisfies the broadcast limiting condition. The first application is a subscriber to the broadcast event. The broadcast limiting condition is saved in an application control file of the first application (for example, a manifest (Manifest) file). The broadcast limiting condition includes at least one of a broadcast frequency limitation, a network status limitation of the user equipment, an application status limitation, or a broadcast content limitation.

In FIG. 11, in step 1101, the control unit 170 of the user equipment receives a request for installing or updating an application program (for example, the foregoing first application). For example, a user uses the application installation screen shown in FIG. 7 to start installation of the application program, or may use the application update screen shown in FIG. 8 to start an update of the application program.

In step 1103, the control unit 170 obtains the broadcast limiting condition. For example, the user may connect to a content server, find an application program to be installed, download the found application program, and send a request for installation of the downloaded application program by using a touch gesture. Then, the control unit 170 may obtain the broadcast limiting condition from an application control file of an application program installation package (for example, AndroidManifest.xml). The broadcast limiting condition herein may be a broadcast limiting condition stated by a broadcast receiver, that is, a broadcast limiting condition stated by an application program corresponding to the broadcast receiver. Optionally, in step 1103, the control unit 170 may obtain the broadcast limiting condition from another file in the storage unit 150 (a file other than the application control file).

In step 1105, the control unit 170 saves the obtained broadcast limiting condition in the storage unit 150.

In step 1107, the control unit 170 receives a broadcast event. The broadcast event may be an intent (Intent) broadcast by a system or a user program. The intent may include an abstract description of an action to be performed, and information that may be based on the intent is applied to perform some operations.

In step 1109, the control unit 170 determines whether the broadcast limiting condition is satisfied. The control unit 170 determines whether a current status of the user equipment matches the saved broadcast limiting condition. For example, the broadcast limiting condition of the application program on a broadcast event of a network status change (CONNECTIVITY_CHANGE) is WiFiStatus=WiFiConnected|StatusBar=PullDown, that is, the broadcast limiting condition is limited as Wi-Fi in connected state and status bar in pull-down state. Therefore, when the user equipment satisfies both of the two conditions of being connected to a Wi-Fi network and the status bar being in the pull-down state, the application program is launched and the broadcast event of the network status change (CONNECTIVITY_CHANGE) is sent to the application program.

If in step 1109, determining that the broadcast limiting condition is satisfied, the control unit 170 launches the application program in step 1111, and sends the broadcast event to the application program in step 1113.

If in step 1109, determining that the broadcast limiting condition is not satisfied, the control unit 170 continues to perform a determining operation in step 1109 until the broadcast limiting condition is satisfied.

In another embodiment, referring to FIG. 12, before step 1109, step 1201 is further included. In step 1201, the control unit 170 determines whether the application program is launched. If determining that the application program has been launched (or is running), the control unit 170 performs step 1113 and sends the broadcast event to the application program; and if in step 1201, determining that the application program is not launched, the control unit 170 performs step 1109. In step 1109, if determining that the broadcast limiting condition is not satisfied, the control unit 170 discards the broadcast event in step 1203 (or may return to step 1109 to continue to determine whether the broadcast limiting condition is satisfied). Other steps in FIG. 12 are the same as steps in FIG. 11 (using same step numbers as FIG. 11), and details are not described herein again.

Figure 13:
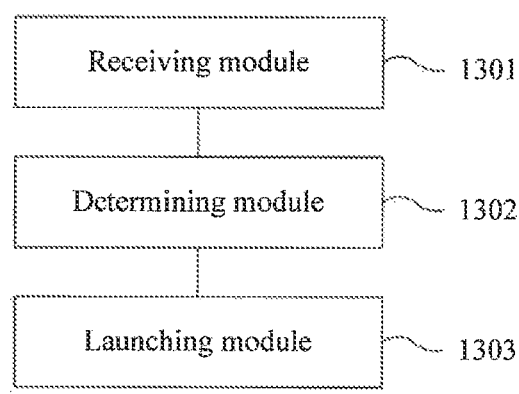
FIG. 13 is a schematic structural diagram of a device according to another embodiment of the present disclosure.

FIG. 13 shows a schematic structural diagram of another device according to an embodiment of the present disclosure. This device includes a receiving module 1301, a determining module 1302, and a launching module 1303. The receiving module 1301 is configured to receive a broadcast event; the determining module 1302 is configured to determine whether a broadcast limiting condition is satisfied; and the launching module 1303 is configured to launch a first application when it is determined that the broadcast limiting condition is satisfied. The first application is a subscriber to the broadcast event.

In the device that is configured to implement the present disclosure, the control unit 170 may be a general purpose processor, a digital signal processor (DSP), an application-specific integrated circuit (ASIC), a field programmable gate array (FPGA), or another programmable logic device, a transistor logic device, a hardware component, or any combination thereof. The processor may implement or execute various example logical blocks, modules, and circuits described with reference to content disclosed in the present invention.

Method or algorithm steps described in combination with the content disclosed in the present disclosure may be implemented by hardware, or may be implemented by a processor by executing a software instruction. The software instruction may be formed by a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in user equipment. Certainly, the processor and the storage medium may exist in the user equipment as discrete components.

A person skilled in the art should be aware that in the foregoing one or more examples, functions described in the present disclosure may be implemented by hardware, software, firmware, or any combination thereof. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made within the spirit and principle of the present disclosure shall fall within the protection scope of the present disclosure.

The invention claimed is:

1. A method, comprising: receiving, via a control unit of user equipment, a broadcast event generated by an operating system or a second application of the user equipment, wherein a first application is a subscriber to the broadcast event; parsing, via a package manager service of the user equipment, whether the first application includes any broadcast limiting conditions registered to it; if no broadcast limiting condition is registered to the first application, dynamically registering a broadcast limiting condition to the first application associated with the broadcast event; determining whether the broadcast limiting conditions registered to the first application are satisfied; launching the first application of the user equipment, in response to determining that the broadcast limiting conditions are satisfied, and dismissing the broadcast event if the broadcast limiting conditions are not satisfied; determining if the received broadcast event matches a predetermined selection of broadcast events, and wherein the step of launching the first application is in response to the broadcast limiting conditions being met and the broadcast event matching a predetermined selection of broadcast events.

2. The method according to claim 1, wherein the broadcast limiting condition is saved in an application control file of the first application.

3. The method according to claim 2, wherein the application control file is a manifest file.

4. The method according to claim 1, wherein after the launching of the first application, the method further comprises: sending the broadcast event to the first application.

5. The method according to claim 1, wherein the operating system is an Android system.

6. The method according to claim 1, wherein the broadcast limiting condition comprises at least one of a broadcast frequency limitation, a network status limitation of user equipment, an application status limitation, or a broadcast content limitation.

7. The method according to claim 1, wherein before the determining whether the broadcast limiting condition is satisfied, the method further comprises: determining that the first application is not launched.

8. User equipment, comprising a memory, one or more processors, a control unit for controlling broadcast event management, a plurality of application programs, and one or more programs, wherein the one or more programs are stored in the memory, and when the one or more processors execute the one or more programs, the user equipment is enabled to perform the following steps: receiving, via the control unit, a broadcast event generated by an operating system or a second application, wherein a first application is a subscriber to the broadcast event; parsing, via a package manager service of the user equipment, whether the first application includes any broadcast limiting conditions registered to it; if no broadcast limiting condition is registered to the first application, dynamically registering a broadcast limiting condition to the first application associated with the broadcast event; determining whether the broadcast limiting conditions registered to the first application are satisfied; launching the first application of the user equipment, in response to determining that the broadcast limiting conditions are satisfied and of dismissing the broadcast event if the broadcast limiting conditions are not satisfied; determining if the received broadcast event matches a predetermined selection of broadcast events, and wherein the launching the first application is in response to the broadcast limiting conditions being met and the broadcast event matching a predetermined selection of broadcast events.

9. The user equipment according to claim 8, wherein the broadcast limiting condition is saved in an application control file of the first application.

10. The user equipment according to claim 9, wherein the application control file is a manifest file.

11. The user equipment according to claim 8, wherein the instruction further comprises: sending the broadcast event to the first application.

12. The user equipment according to claim 8, wherein the system is an Android system.

13. The user equipment according to claim 8, wherein the broadcast limiting condition comprises at least one of a broadcast frequency limitation, a network status limitation of the user equipment, an application status limitation, or a broadcast content limitation.

14. The user equipment according to claim 8, wherein the instruction further comprises: determining that the first application is not launched.

15. The user equipment according to claim 8, wherein the user equipment is further configured to perform the step of determining if the received broadcast event matches a predetermined selection of broadcast events, and wherein the step of launching the first application is in response to the broadcast limiting conditions being met and the broadcast event matching a predetermined selection of broadcast events.

16. A non-transitory computer readable medium, wherein the computer readable medium is configured to store instructions that, when executed by a processor of user equipment, cause the user equipment to perform the operations comprising: receiving, via the control unit, a broadcast event generated by an operating system or a second application, wherein a first application is a subscriber to the broadcast event; parsing, via a package manager service of the user equipment, whether the first application includes any broadcast limiting conditions registered to it; if at least one broadcast limiting condition is registered to the first application, if no broadcast limiting condition is registered to the first application, dynamically registering a broadcast limiting condition to the first application associated with the broadcast event; determining whether the broadcast limiting conditions registered to the first application is are satisfied; and launching the first application of the user equipment, in response to determining that the broadcast limiting conditions are satisfied and dismissing the broadcast event if the broadcast limiting conditions are not satisfied; determining if the received broadcast event matches a predetermined selection of broadcast events, and wherein the step of launching the first application is in response to the broadcast limiting conditions being met and the broadcast event matching a predetermined selection of broadcast events.

17. The non-transitory computer readable medium according to claim 16, wherein the broadcast limiting condition is saved in an application control file of the first application.

18. The non-transitory computer readable medium according to claim 17, wherein the application control file is a Manifest file.

19. The non-transitory computer readable medium according to claim 16, wherein the operations further comprise: sending the broadcast event to the first application.

20. The non-transitory computer readable medium according to claim 16, wherein the operating system is an Android system.

21. The non-transitory computer readable medium according to claim 16, wherein the broadcast limiting condition comprises at least one of a broadcast frequency limitation, a network status limitation of user equipment, an application status limitation, or a broadcast content limitation.

22. The non-transitory computer readable medium according to claim 16, wherein the instructions are further configured cause the user equipment to determine if the received broadcast event matches a predetermined selection of broadcast events, and launch the first application is in response to the broadcast limiting conditions being met and the broadcast event matching a predetermined selection of broadcast events.

* * * * *